(12) United States Patent  (10) Patent No.: US 6,977,720 B2
Baney et al.  (45) Date of Patent: Dec. 20, 2005

(54) CHARACTERIZATION OF ACTIVE AND PASSIVE OPTICAL PROPERTIES OF AN OPTICAL DEVICE

(75) Inventors: Douglas M. Baney, Los Altos, CA (US); Gregory D. VanWiggeren, Los Gatos, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 198 days.

(21) Appl. No.: 10/634,952

(22) Filed: Aug. 5, 2003

(65) Prior Publication Data

US 2005/0030522 A1 Feb. 10, 2005

(51) Int. Cl.⁷ .......................................... G01N 21/00
(52) U.S. Cl. ................................... 356/73.1
(58) Field of Search ..................... 356/73.1; 398/9–38, 398/173–181

(56) References Cited

U.S. PATENT DOCUMENTS 5,677,781 A 10/1997 Mori et al.
2004/0001194 A1 * 1/2004 Wilstrup et al. ........... 356/73.1

FOREIGN PATENT DOCUMENTS

EP 0 594 178 A1 10/1993
EP 1113250 A1 11/2000
EP 1148664 A2 4/2001

OTHER PUBLICATIONS

Vanwwiggeren, Gregory D., "Single-Scan Interferometric Component Analyzer," IEEE Photonics Technology Letters, vol. 15, No. 2, Feb. 2003.
Vanwiggeren, Gregory D., "Swept-Wavelength Interferometric Analysis of Multiport Components," IEEE Photonics Technology Letters, Submitted Feb. 11, 2002.
European Search Report Dated: Dec. 17, 2004.

* cited by examiner

Primary Examiner—Tu T. Nguyen (57) ABSTRACT

Characterizing active and passive properties of an optical device involves applying a local oscillator signal to a device under test (DUT) and providing a portion of the local oscillator signal (referred to as the reference local oscillator signal) directly to the an optical analyzer. Providing the reference local oscillator signal to the optical analyzer enables interferometric measurements associated with the DUT to be obtained along with direct measurements, where the interferometric measurements result from combining the portion of the local oscillator signal that is applied to the DUT with the reference local oscillator signal. The interferometric measurements are used to characterize passive properties of the DUT while the direct measurements are used to characterize active properties of the DUT.

21 Claims, 5 Drawing Sheets

CHARACTERIZATION OF ACTIVE AND PASSIVE OPTICAL PROPERTIES OF AN OPTICAL DEVICE

FIELD OF THE INVENTION

The invention relates generally to the characterization of optical devices, and more particularly, to the characterization of active and passive optical properties of an optical device.

BACKGROUND OF THE INVENTION

Optical devices can have both active and passive optical properties. For example, an optical amplifier has an active optical property such as the quantity of optical noise or amplified spontaneous emission (ASE) generated within the active region of the amplifier as well as predominantly passive optical properties such as transmission loss, transmission gain, polarization dependent loss, return loss, polarization mode dispersion, and chromatic dispersion. Typically, an optical spectrum analyzer (OSA) is used to characterize the active properties of an optical device while a separate optical network analyzer (ONA) is used to fully characterize the passive properties of the optical device. Using two different testing systems to characterize an optical device has drawbacks that include the expense of maintaining two different testing systems, increased setup time, additional measurement uncertainty from multiple optical connections to various test setups, and reliance on stable device and/or test system properties during test.

In view of the need to fully characterize the optical properties of an optical device, what is needed is an efficient technique for characterizing an optical device that includes characterizing both active and passive properties of the device.

SUMMARY OF THE INVENTION

Characterizing active and passive properties of an optical device involves applying a local oscillator signal to a device under test (DUT) and providing a portion of the local oscillator signal (referred to as the reference local oscillator signal) directly to an optical analyzer. Providing the reference local oscillator signal to the optical analyzer enables interferometric measurements of the passive DUT properties to be characterized along with the DUT active properties. The DUT optical output is composed of a mix of active and passive contributions that can be separated using a split detection method composed of direct detection bands and passive characterization frequency bands. The separated active and passive contributions of the DUT output provides for measurement of the active and passive characteristics of the DUT.

BRIEF DESCRIPTION OF THE DRAWINGS

Throughout the description, similar reference numbers may be used to identify similar elements.

DETAILED DESCRIPTION OF THE INVENTION

Figure 1:
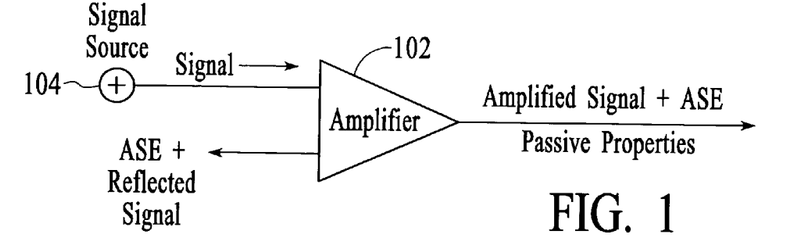
FIG. 1 depicts an optical amplifier that is used to amplify a signal from a signal source.

FIG. 1 depicts an optical amplifier 102 that is used to amplify a signal from a signal source 104. The optical properties that are of interest in a characterization of the optical amplifier include active properties and passive properties. Active properties include the noise (e.g., amplified spontaneous emissions (ASE)) or double Rayleigh backscatter generated within the amplifier and delivered to the input and/or output ports of the amplifier. Passive properties of the amplifier include transmission gain, transmission loss, reflection, polarization dependent loss, return loss, polarization mode dispersion, and chromatic dispersion of the light that is output from the amplifier.

Figure 2:
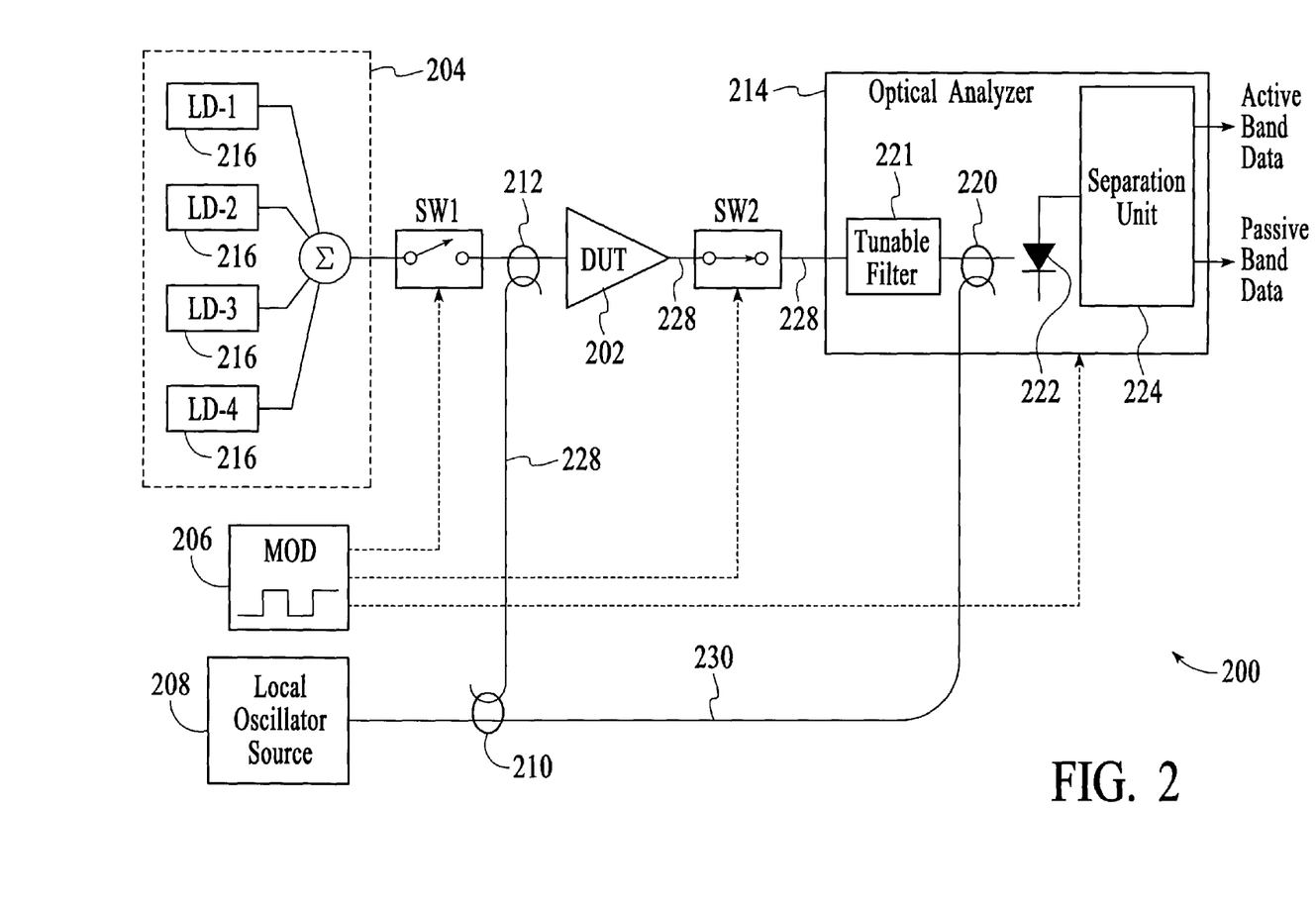
FIG. 2 depicts a system for characterizing active and passive properties of a DUT such as an optical amplifier in accordance with the invention.

FIG. 2 depicts a system 200 for characterizing active and passive properties of a DUT such as an optical amplifier. The system includes an optical saturation tone generator 204, optical switches SW1 and SW2, a modulator 206, a local oscillator source 208, couplers 210 and 212, and an optical analyzer 214. The system is optically connectable to a DUT 202 such as an optical amplifier. Although an amplifier is depicted in FIG. 2 and described for example purposes, the below-described systems and methods are applicable to other optical devices.

The saturation tone generator 204 includes multiple laser diodes 216 that provide optical signals to the amplifier 202. In an embodiment, the wavelengths of the emitted saturation tones are selected to mimic the signals in a wavelength division multiplexed (WDM) communications network and the amplitudes are individually set as required for the test. For example, the saturation tones are emitted in the 1.3 micron or 1.5 micron bands. For example, within the 1.5 micron band, one or more optical saturation tones can be placed on standard ITU frequency grid spacings. Other embodiments of the saturation tone generator use alternative elements to set the amplifier saturation state. Example alternatives include an agile laser that sweeps rapidly compared to the transient response of the amplifier gain or a broadband optical source with a spectral content that can be equalized to mimic the DWDM test conditions The optical switches SW1 and SW2 are used in the measurement of ASE that is generated at the amplifier 202. It is desirable to measure the ASE at particular wavelengths (also referred to herein as channels) that correspond to WDM communications channels. It is well known that the gain of erbium-doped optical amplifiers changes relatively slowly compared to the rate that optical signals can be modulated or optically gated. Because of this difference in responsivity, the ASE at a channel can be accurately measured by applying a saturation tone to the amplifier, turning off the saturation tone (e.g. by opening switch SW1) and then measuring the received ASE. The modulator is used to control the opening and closing of the switches in a manner that enables characterization of the ASE according to the well-known time domain extinction method.

The local oscillator source 208 is a highly coherent tunable laser that is continuously tunable over a wavelength range. During operation, the local oscillator source generates a highly coherent optical local oscillator signal that can be tuned or continuously swept across a range of frequencies, or wavelengths, in order to characterize optical properties of the DUT 202 over the range of frequencies or wavelengths. In an embodiment, a local oscillator signal in the 1.5 micron band is continuously swept at a rate of approximately 40 nm/s or 6.15 MHz/$\mu$s and the sweep range is approximately 100 nm, however the sweep rate and sweep range can be higher or lower and may involve sweeping across several ITU grid points of several nanometers. In an embodiment, the wavelength range is selected as a function of the DUT. The output of local oscillator source can be modulated in intensity or polarization, for example, to facilitate detection of ASE or to obtain polarization diverse reception. In an embodiment referring to FIG. 3B when the active band 338 is used to characterize ASE, the local oscillator source may be momentarily gated off to allow measurement of ASE free of the additional power contributed by the local oscillator source. The gating is accomplished using internal current control to the local oscillator source, or by using external optical intensity modulators. For example, in FIG. 2, a switch can be placed between the local oscillator source 208 and the coupler 210 to modulate the intensity of the local oscillator state from an on state to an off state. This is similar to the well-known time domain extinction method described below to reduce the effect of saturation signals on the detection of ASE. In this case, it is applied to the probing signal that enables measurement of the passive device characteristics in accordance with FIGS. 2, 4, 5, and 6.

The couplers 210 and 212 optically connect the local oscillator source 208 to the DUT 202 and the optical analyzer 214. A coupler 220 within the optical analyzer combines light from the DUT with the reference swept local oscillator signal from the local oscillator source 208. The optical couplers may be optically directional 3 dB fiber couplers, although other well-known optical couplers, combiners, or polarization diverse methods may be utilized. In an embodiment, the optical couplers are substantially independent of the wavelength and polarization of the input light. The optical couplers may be single mode optical couplers.

The optical analyzer 214 includes a tunable optical filter 221, the coupler 220, a detector 222, and a separation unit 224. The tunable filter functions as an optical passband filter, which reduces out of band noise. Example tunable filters include tunable Fabry-Perot filters, free-space diffraction grating-based filters, tunable fiber Bragg grating filters used in combination with optical couplers or circulators to convert the filter's bandstop function into a bandpass function, and tunable acousto-optics filters in bulk or planar form. The tunable filter allows ASE measurements to be made as a function of wavelength. Alternatively, the tunable filter can be located after the coupler 220.

The detector is optically connected to the coupler 220 to receive optical signals from the DUT 202 and the local oscillator source 208. The detector produces electrical signals in response to the optical signals from the DUT and the local oscillator source. In an embodiment, the detector utilizes square law detection, which results in mixing of the optical signals from the DUT and from the local oscillator source. Mixing of the optical signals from the DUT and from the swept local oscillator signal produces a heterodyne beat signal at a frequency that is proportional to the product of the local oscillator source sweep rate and the relative delay through the test path with respect to the reference path. While a single detector is shown, it is well-known that multiple detectors can be used to provide balanced detection to reduce noise and to provide polarization diverse reception as required for the testing of the DUT. In an alternative embodiment, the optical analyzer 214 could include an optical detector located prior to the coupler 220 that is used to measure ASE. The heterodyne beat signal from the optical detector is provided to the separation unit.

The separation unit 224 receives an electrical baseband signal from the detector 222. As is described in more detail below, the baseband signal includes active band data and passive band data. The separation unit separates active band data from passive band data. The separation unit is a key component of the invention, which is described in more detail below.

In the system of FIG. 2, the local oscillator source 208 is optically connected to the optical analyzer 214 by two paths, a test path 228 and a reference path 230. The test path includes the DUT and the reference path does not include the DUT. In accordance with the invention, the reference path in the system of FIG. 2 enables the characterization of passive properties of the amplifier to be accomplished along with the characterization of active properties of the amplifier. Specifically, the reference path enables interferometric measurements associated with the amplifier to be obtained along with direct measurements, where the interferometric measurements result from combining the portion of the swept local oscillator signal that travels the test path (including the DUT) with the portion of the swept local oscillator signal that travels the reference path. In accordance with the invention, the interferometric measurements are obtained along with the direct measurements that are used to characterize active properties of the amplifier. The interferometric and direct measurements are obtained in the form of a baseband signal that includes both active band data and passive band data. The active band data and the passive band data are then separated from each other and the active band data is used to characterize active properties of the DUT while the passive band data is used to characterize passive properties of the DUT. In another embodiment, the reference path in the system of FIG. 2 enables the characterization of passive properties of the amplifier to be accomplished in simultaneously with the characterization of active properties of the amplifier.

The active band data can be separated from the passive band data using different approaches. In one approach, the active band data is separated from the passive band data by dividing the baseband signal into first and second signals and filtering the first signal to pass active band signals and filtering the second signal to pass passive band signals. In another approach, the active band data is separated from the passive band data by converting the baseband signal into digital data and processing the digital data to identify active band data separate from passive band data. In still another approach, the optical signals that are representative of active and passive characteristics of the DUT are divided into two different optical signals. One of the optical signals is combined with the swept local oscillator signal and the different signals are separately detected. Active band data is isolated by filtering the baseband signal that is generated without the swept local oscillator signal and passive band data is isolated by filtering the baseband signal that is generated with the swept local oscillator signal.

Operation of the system of FIG. 2 to characterize active and passive properties of an optical amplifier is described with reference to FIG. 2. The techniques used to characterize the active properties of the amplifier are briefly described first followed by a description of the techniques used to characterize the passive properties of the amplifier.

Two properties of the amplifier that are often characterized are gain and ASE. The amplifier gain can be characterized by applying the swept local oscillator signal to the amplifier, measuring the output power across the range of wavelengths, and then comparing the output power to the power that is measured in a calibration sweep. Commonly used techniques for bypassing the amplifier for calibration include using two optical switches, an optical switch and an optical coupler, or a patch cord. In the embodiment of FIG. 2, a calibration sweep may involve optically bypassing the DUT 202, for example, through a calibration path and measuring the output power of the swept local oscillator signal. Alternatively, the amplifier gain at each saturation tone (referred to as the "spot gain") could be measured by applying the saturation tones and comparing the input and output powers at each saturation tone.

The ASE of the amplifier can be characterized using the well-known time-domain extinction (TDE) technique (also referred to as the "pulse" method for optical noise characterization). In the TDE technique, the saturation tone, or tones, that would otherwise interfere with the ASE measurement are momentarily gated off (for example by opening switch SW1 in FIG. 2). Because of the slow gain dynamics of the amplifier, the ASE can be measured after the saturation tone is gated off. Referring to FIG. 2, with switch SW1 closed and switch SW2 open, a saturation tone from the saturation tone generator 204 is provided to the DUT 202. The modulator 206 then causes the switch SW1 to open and switch SW2 to close, thereby enabling the ASE of the amplifier to be characterized at a particular channel.

A complete description of the techniques for characterizing the gain and ASE of an amplifier using a system that is similar to the system of FIG. 2 is described in the book *Fiber Optic Test and Measurement*, published by Prentice Hall PTR, 1998, Chapter 13, which is incorporated by reference herein. In addition to the techniques described herein, other techniques could be used to characterize the gain and ASE of the DUT without deviating from the scope of the invention.

Characterizing the passive properties of the amplifier 202 using the system of FIG. 2 involves providing portions of the swept local oscillator signal to the test path 228 and to the reference path 230 at the same time. The portion of the swept local oscillator signal that travels the test path is applied to the DUT. Application of the swept local oscillator signal to the DUT imparts some delay on the swept local oscillator signal. The delayed portion of the swept local oscillator signal is then combined with the reference portion of the swept local oscillator signal at the optical analyzer 214. The combined optical signals are detected in the optical analyzer and the delay between the two portions of the swept local oscillator signal causes beat frequencies that are used to characterize passive properties of the amplifier. Characterizing passive properties of an optical device using interferometric techniques is known in the field and is not described in detail herein.

In accordance with the invention, optical signals received at the optical analyzer 214 via the test path are representative of both active and passive properties of the DUT 202. By combining at least a portion of the optical signals received via the test path with the swept local oscillator signal from the reference path, data related to both active and passive properties of the amplifier can be obtained. The data is obtained as an electrical baseband signal that includes both active and band data and passive band data.

Figure 3A:
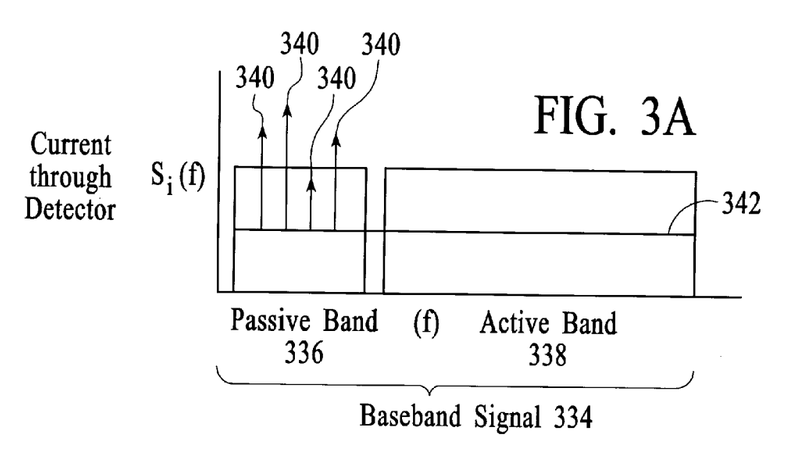
FIG. 3A graphically depicts the baseband signal that is generated from a characterization of an amplifier where the upper frequency band is used for ASE characterization as described above with reference to FIG. 2.

FIG. 3A graphically depicts an electrical baseband signal 334 that is generated from a characterization of an amplifier as described above with reference to FIG. 2. The baseband signal is depicted as the electrical current through a detector ($S_i(f)$) as a function of the electrical frequency (f). As described above, the baseband signal includes a passive band and an active band. In the example of FIG. 3A, the passive band (i.e., the lower band) resides at lower frequencies and is dedicated to the characterization of the passive properties of the DUT. All of the beat frequencies 340 (also referred to as beat tones) that are generated from the mixing of the reference portion of the swept local oscillator signal with the test portion of the swept local oscillator signal reside in the passive band. These beat frequencies are captured as a function of wavelength and enable characterization of the passive DUT properties versus wavelength. Since a particular beat frequency is proportional to the product of the local oscillator sweep rate and the delay through the test path, the upper extent of the passive band depends on the sweep rate and the delay. The active band (i.e., the upper band) resides at the upper frequencies and is dedicated to the characterization of active properties of the DUT. In particular, the ASE noise generated by the DUT is characterized from data in the active band. The active band can extend in bandwidth as necessary to capture the desired amount of noise. The detected ASE noise in this embodiment results from the beating between the ASE optical field noise and the reference portion of the swept local oscillator signal. This beat noise is captured and recorded as a function of wavelength to provide a characterization of the ASE versus wavelength for the DUT. Additionally, the active band could contain contributions from both images of the optoelectronic mixing as is the usual case in optical heterodyne mixing or it could contain just one image as is the case in image-rejecting optical heterodyne receivers. The line 342 represents the DUT ASE beat with the swept local oscillator signal. The DUT ASE beat signal is used to determine the level of ASE when the swept local oscillator signal power and optoelectronic detection efficiency are known.

Figure 3B:
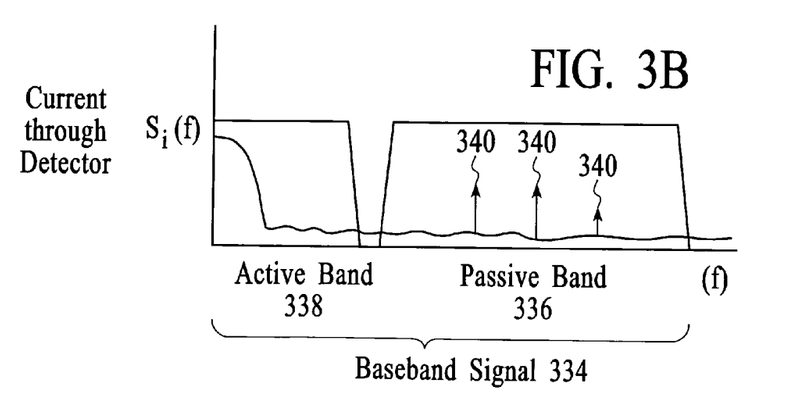
FIG. 3B graphically depicts the baseband signal that is generated from a simultaneous characterization of an amplifier where the lower frequency band is used for ASE characterization as described above with reference to FIG. 2.

FIG. 3B graphically depicts another electrical baseband signal 334 that is generated from characterization of an amplifier. The baseband signal in FIG. 3B depicts the situation in which the active band 338 resides at lower frequencies (e.g., 0–approximately 10 kHz) than the passive band 336 (e.g., approximately 20 kHz and up). In the case where the active band resides at a lower frequency than the passive band, the tunable filter is swept across a range of wavelengths to allow for measurement of ASE as a function of wavelength.

Figure 4:
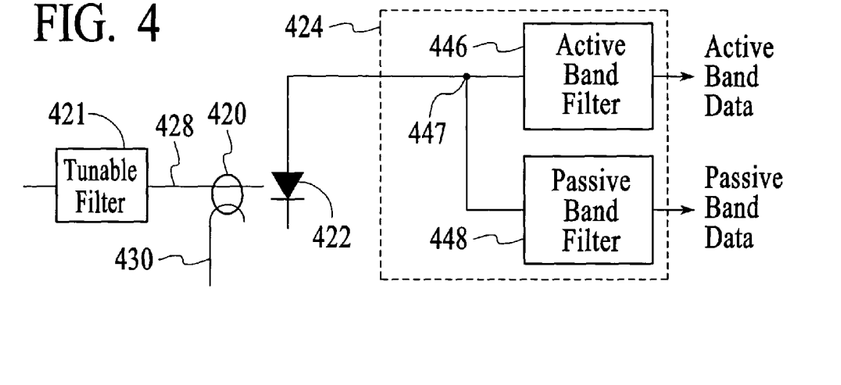
FIG. 4 depicts a system for separating active band data from passive band data that involves dividing the baseband signal into first and second signals and filtering the signals to pass the desired data in accordance with the invention.
Figure 5:
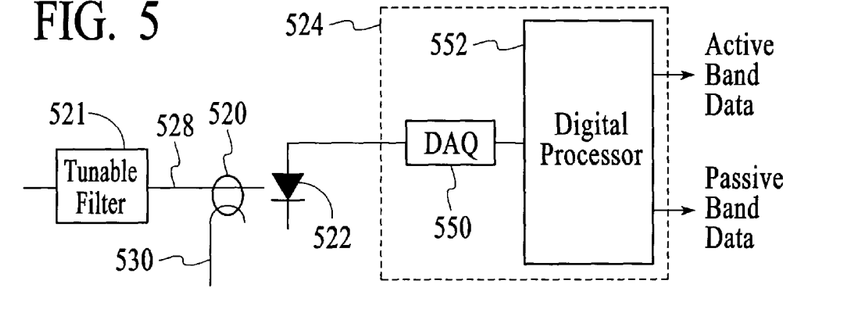
FIG. 5 depicts a system for separating active band data from passive band data that involves converting analog electrical signals into digital data and processing the digital data to identify the active band data separate from the passive band data in accordance with the invention.
Figure 6:
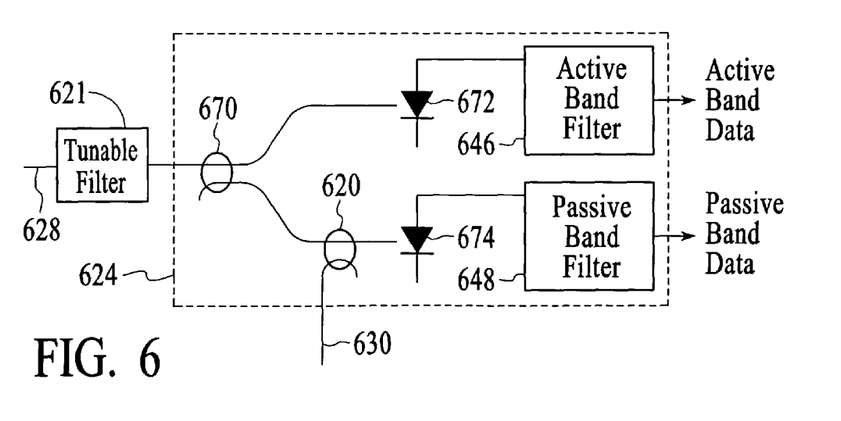
FIG. 6 depicts a system for separating active band data from passive band data that involves dividing the incoming optical signal into first and second optical signals, combining one of the split signals with a reference portion of the swept local oscillator signal, separately detecting the optical signals, and then filtering the baseband signals to pass the desired data in accordance with the invention.

In order to characterize the active and passive properties of the amplifier given the baseband signal 334, the active and passive bands 336 and 338 must be separated from each other. The function of the separation unit is to separate the baseband signal into active band data and passive band data that can be used to characterize the DUT. The active band data can be separated from the passive band data using different approaches. FIGS. 4–6 depict examples of embodiments of separation units that can be utilized to separate the active band data from the passive band data.

FIG. 4 depicts an embodiment of a separation unit 424 that divides the baseband signal into first and second signals and filters the signals to pass the desired data. The separation unit includes an active band filter 446 and a passive band filter 448. In operation, a test signal is received from the DUT through test fiber 428 and a reference signal is received from the local oscillator source through reference fiber 430. In the embodiment of FIG. 4, the test fiber is the same as fiber 228 from FIG. 2 and the reference fiber is the same as fiber 230 from FIG. 2. The test fiber carries optical signals from the DUT and the reference fiber carries the swept local oscillator signal from the local oscillator source. The signals are combined at the coupler 420 and a combined optical signal is output to the detector 422. An electrical signal is generated by the detector in response to the combined optical signal. The system may also include other electrical components, such as optical amplifiers (not shown), which commonly follow detectors to reduce the effects of receiver thermal noise. Transimpedance amplifiers can be used to improve receiver bandwidth while reducing thermal noise levels. The electrical baseband signal is then divided into first and second electrical signals by an electrical splitter 447. The first and second electrical signals are provided to the corresponding active band and passive band filters. The active band filter filters out passive band signals from the received signal and passes active band signals. The active band signals are used to characterize active properties of the amplifier. Likewise, the passive band filter filters out active band signals from the received signal and passes passive band signals. The passive band signals are used to characterize active properties of the optical amplifier.

FIG. 5 depicts an embodiment of a separation unit 524 that converts analog electrical signals into digital data and digitally processes the digital data to identify the active band data separate from the passive band data. The system includes a data acquisition unit (DAQ) 550 and a digital processor 552. The DAQ includes an analog-to-digital converter that converts the analog electrical signals into digital data. The digital processor may include a microprocessor based system that processes the digital data according to specified algorithms. In operation, a test signal is received from the DUT through test fiber 528 and a reference signal is received from the local oscillator source through reference fiber 530. In the embodiment of FIG. 5, the test fiber is the same as fiber 228 from FIG. 2 and the reference fiber is the same as fiber 230 from FIG. 2. The test fiber carries optical signals from the DUT and the reference fiber carries the swept local oscillator signal from the local oscillator source. The signals are combined at the coupler 520 and a combined optical signal is output to the optical detector 522. An analog electrical signal is generated by the detector in response to the combined optical signal. The analog electrical signal is then converted to digital data by the DAQ. The digital data, which includes both active band data and passive band data, is then provided to the digital processor. The digital processor utilizes digital processing to separate the active band data from the passive band data and then uses the active and passive band data to characterize the respective active and passive properties of the DUT.

FIG. 6 depicts another embodiment of a separation unit 624 that involves optically dividing the optical signals from the test path into separate optical signals. One of the optical signals is used to obtain active band data and the other optical signal is combined with the reference portion of the swept local oscillator signal and the combined optical signals are used to obtain passive band data. The separation unit includes an optical splitter 670, an optical coupler 620, two detectors 672 and 674, an active band filter 646, and a passive band filter 648. In operation, optical signals from the DUT pass through the tunable filter 621 and are divided into separate optical signals by the splitter 670. One of the split optical signals (referred to herein as the first optical signal) is directed to detector 672. The first optical signal is detected and the resulting baseband signal is filtered by the active band filter. The active band filter passes active band data that is used to characterize an active property of the DUT. The other split optical signal (referred to herein as the second optical signal) is directed to the coupler 620, where it is combined with the reference portion of the swept local oscillator signal that is carried in the reference path 630. The combined optical signal is detected by detector 674 and the resulting baseband signal is filtered by the passive band filter. The passive band filter passes passive band data that is used to characterize a passive property, or properties, of the DUT. In the embodiment of FIG. 6, the separation unit includes some optical processing in addition to electrical processing. Although some techniques are described herein for separating the active band data from the passive band data, other techniques could be used without deviating from the scope of the invention.

As can be seen from the systems described above with reference to FIGS. 2–6, the characterization of the active and passive properties of an optical amplifier is accomplished using a single local oscillator source. Because the active and passive properties are characterized using a single local oscillator source, there is close wavelength correlation between the active and passive measurements. Additionally, the characterization of both active and passive properties of a DUT is accomplished with a single setup between the test system and the DUT.

Figure 7:
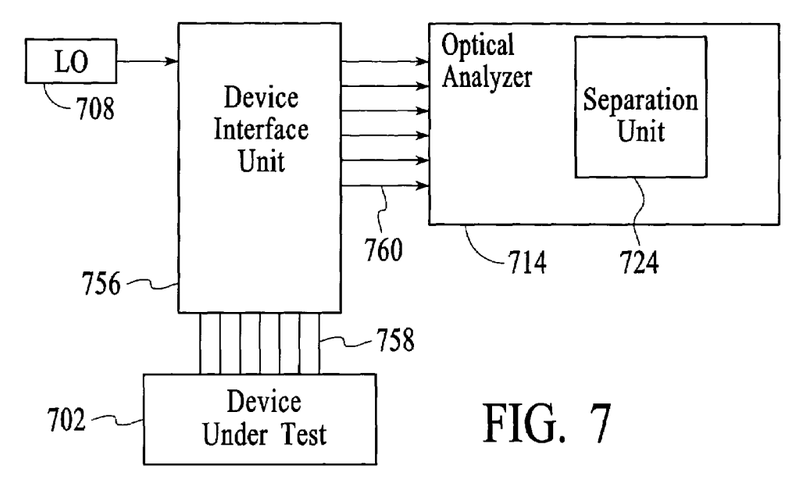
FIG. 7 depicts an embodiment of a generic system for characterizing active and passive properties of a DUT in accordance with the invention.

Although the techniques for characterizing active and passive properties of a DUT are described above using the system of FIG. 2, the techniques can be broadly applied to other system implementations as long as a swept local oscillator signal is applied to the DUT and then combined with a reference portion of the swept local oscillator signal before being detected at the receiver unit. FIG. 7 depicts an embodiment of a generic system for characterizing active and passive properties of a DUT. In the system of FIG. 7, a device interface unit 756 optically connects a local oscillator source 708, a DUT 702, and an optical analyzer 714. The device interface unit functions to provide a test portion of the swept local oscillator signal to the DUT and to provide a reference portion of the swept local oscillator signal to the optical analyzer. The device interface unit may include multiple optical connections 758 and 760 between the DUT and the optical analyzer depending on the type of DUT. The optical analyzer includes a separation unit 724 that functions to separate the baseband signal into active band data and passive band data as described above.

Figure 8:
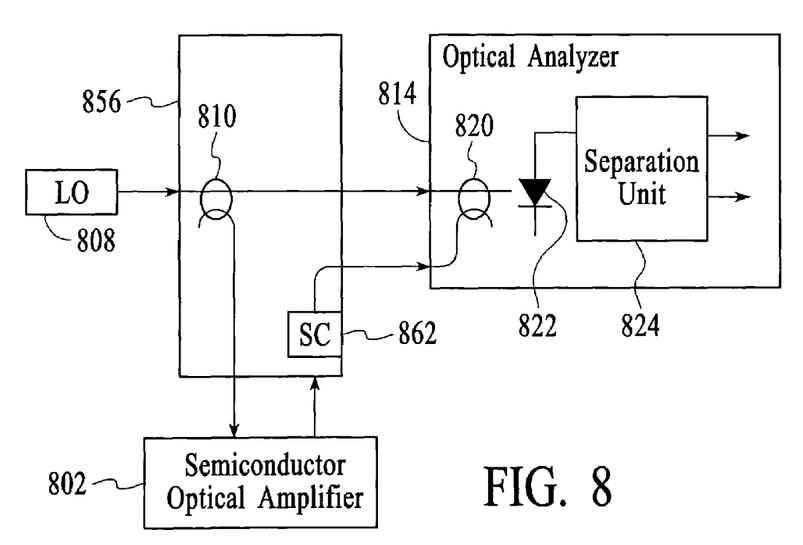
FIG. 8 depicts a particular embodiment of the system of FIG. 7, in which the active and passive properties of an optical amplifier are to be characterized in accordance with the invention.

FIG. 8 depicts an embodiment of the system of FIG. 7, in which the active and passive properties of an optical amplifier 802 are to be characterized. In the system of FIG. 8, the device interface unit 856 includes a coupler 810 and a signal conditioner 862. The coupler enables a test portion of the swept local oscillator signal to be provided to the amplifier while a reference portion of the swept local oscillator signal is provided directly to the optical analyzer 814. The signal conditioner functions to reduce the amplitude of the test portion of he swept local oscillator signal output from the DUT. This can be beneficial because it reduces the magnitude of the interference that occurs between the test portion of the swept local oscillator signal and the DUT ASE at detector 822. Reducing the amplitude of the output test portion of the swept local oscillator also allows the interference that occurs between the reference portion of the swept local oscillator and DUT ASE to dominate the signal detected at detector 822, which simplifies the analysis and measurement of DUT ASE versus wavelength.

Although in the embodiment of FIG. 2 the optical analyzer utilizes a single combined optical signal for detection of the optical signals, other embodiments may involve utilizing multiple portions of the combined optical signals. For example, two portions of a combined optical signal may be provided to two detectors to achieve polarization diversity and four portions of the combined optical signal may be provided to four detectors to achieve noise balance and polarization diversity.

Figure 9:
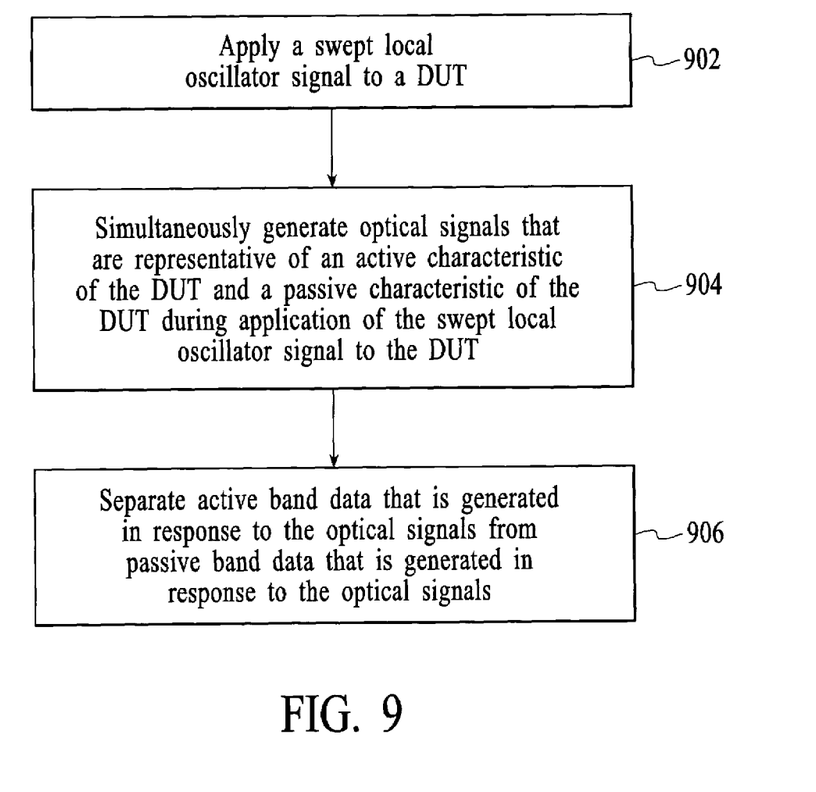
FIG. 9 depicts an embodiment of a process flow diagram of a method for optically characterizing a DUT in accordance with the invention.

FIG. 9 depicts a process flow diagram of a method for optically characterizing a DUT. At block 902, a swept local oscillator signal is applied to a DUT. At block 904, optical signals that are representative of an active characteristic of the DUT and a passive characteristic of the DUT are generated during application of the swept local oscillator signal to the DUT. At block 906, active band data that is generated in response to the optical signals is separated from passive band data that is generated in response to the optical signals.

Although specific embodiments in accordance with the invention have been described and illustrated, the invention is not limited to the specific forms and arrangements of parts so described and illustrated. The invention is limited only by the claims.

What is claimed is:

1. A method for characterizing optical properties of a device under test (DUT) comprising:
   applying a local oscillator signal to a DUT;
   generating optical signals that are representative of an active characteristic of said DUT and a passive characteristic of said DUT during application of said local oscillator signal to said DUT; and
   separating active band data that is generated in response to said optical signals from passive band data that is generated in response to said optical signals.

2. The method of claim 1 further including combining said local oscillator signal that is applied to said DUT with a portion of said local oscillator signal that is not applied to said DUT before said optical signals are detected.

3. The method of claim 1 wherein separating active band data from passive band data includes filtering an electrical baseband signal that includes active band signals and passive band signals.

4. The method of claim 1 wherein separating active band data from passive band data includes dividing an electrical baseband signal into first and second electrical signals and filtering said first electrical signal to pass active band signals and filtering said second electrical signal to pass passive band signals.

5. The method of claim 1 wherein separating active band data from passive band data includes converting a baseband signal that includes active band signals and passive band signals into digital data and processing said digital data to identify active band data separate from passive band data.

6. The method of claim 1 wherein separating active band data from passive band data includes:
   dividing said generated optical signals into first and second optical signals;
   combining said second optical signal with a portion of said local oscillator signal;
   separately detecting said first optical signal and said combined optical signal to generate corresponding first and second electrical signals; and
   filtering said first electrical signal to pass active band signals and filtering said second electrical signal to pass passive band signals.

7. The method of claim 1 further including:
   using said active band data to characterize active properties of said DUT; and
   using said passive band data to characterize passive properties of said DUT.

8. The method of claim 7 wherein active properties of said DUT include amplified spontaneous emissions and wherein passive band properties of said DUT include at least one of gain, polarization dependent loss, return loss, polarization mode dispersion, and chromatic dispersion.

9. The method of claim 1 further including applying optical saturation tones to said DUT to characterize properties of said DUT.

10. The method of claim 1 further including modulating the power of said local oscillator signal to facilitate measurement of at least one of optical noise, polarization dependent loss, return loss, polarization mode dispersion, and chromatic dispersion.

11. A system for characterizing optical properties of a device under test (DUT) comprising:
    a local oscillator source for providing a local oscillator signal to a DUT;
    a device interface unit, in optical communication with said local oscillator source, which generates optical signals that are representative of an active characteristic of said DUT and a passive characteristic of said DUT during application of said local oscillator signal to said DUT; and
    a separation unit, in optical communication with said device interface unit, which separates active band data that is generated in response to said optical signals from passive band data that is generated in response to said optical signals.

12. The system of claim 11 wherein said device interface unit includes an optical path that provides a reference portion of said local oscillator signal directly to an optical analyzer.

13. The system of claim 12 further including a coupler for combining said local oscillator signal that is provided to said DUT with said reference portion of said local oscillator signal before said optical signals are detected by said optical analyzer.

14. The system of claim 11 wherein said separation unit includes:
   a detector for detecting said optical signals that are representative of an active characteristic of said DUT and a passive characteristic of said DUT;
   an electrical splitter for dividing an electrical baseband signal into first and second electrical signals;
   an active band filter for filtering said first electrical signal to pass active band signals; and
   a passive band filter for filtering said second electrical signal to pass passive band signals.

15. The system of claim 11 wherein said separation unit includes:
   a detector for detecting said optical signals that are representative of an active characteristic of said DUT and a passive characteristic of said DUT;
   a digital acquisition unit for converting an electrical baseband signal that includes active band signals and passive band signals into digital data; and
   a processor for processing said digital data to identify active band data separate from passive band data.

16. The system of claim 11 wherein said separation unit includes:
   an optical splitter for dividing said generated optical signals into first and second optical signals;
   an optical coupler for combining said second optical signal with a portion of said local oscillator signal;
   first and second detectors for separately detecting said first optical signal and said combined optical signal to generate corresponding first and second electrical signals; and
   an active band filter for filtering said first electrical signal to pass active band signals; and
   a passive band filter for filtering said second electrical signal to pass passive band signals.

17. A system for characterizing optical properties of a device under test (DUT) comprising:
   a local oscillator source for providing a local oscillator signal to a DUT;
   an optical analyzer; and
   a device interface unit that optically connects said local oscillator source and said optical analyzer to said DUT;
   said device interface unit being in optical communication with said local oscillator source and optically connectable to said DUT to simultaneously generate optical signals that are representative of an active characteristic of said DUT and a passive characteristic of said DUT during application of said local oscillator signal to said DUT;
   said optical analyzer including a separation unit for separating active band data that is generated in response to said optical signals from passive band data that is generated in response to said optical signals.

18. The system of claim 17 wherein said optical analyzer includes a coupler for combining said local oscillator signal that is provided to said DUT with a reference portion of said local oscillator signal before said optical signals are detected.

19. The system of claim 17 wherein said separation unit includes:
   a detector for simultaneously detecting said optical signals that are representative of an active characteristic of said DUT and a passive characteristic of said DUT;
   an electrical splitter for dividing an electrical baseband signal into first and second electrical signals;
   an active band filter for filtering said first electrical signal to pass active band signals; and
   a passive band filter for filtering said second electrical signal to pass passive band signals.

20. The system of claim 17 wherein said separation unit includes:
   a detector for simultaneously detecting said optical signals that are representative of an active characteristic of said DUT and a passive characteristic of said DUT;
   a digital data acquisition unit for converting a baseband signal that includes active band signals and passive band signals into digital data; and
   a processor for processing said digital data to identify active band data separate from passive band data.

21. The system of claim 17 wherein said separation unit includes:
   an optical splitter for dividing said generated optical signals into first and second optical signals;
   an optical coupler for combining said second optical signal with a portion of said local oscillator signal;
   first and second detectors for separately detecting said first optical signal and said combined optical signal to generate corresponding first and second electrical signals; and
   an active band filter for filtering said first electrical signal to pass active band signals; and
   a passive band filter for filtering said second electrical signal to pass passive band signals.

* * * * *